US009794602B2

(12) United States Patent
Kummer

(10) Patent No.: US 9,794,602 B2
(45) Date of Patent: Oct. 17, 2017

(54) SYSTEMS AND METHODS FOR SECURELY PROVIDING STREAMING MEDIA CONTENT ON-DEMAND

(71) Applicant: EchoStar Technologies L.L.C., Englewood, CO (US)

(72) Inventor: David A. Kummer, Highlands Ranch, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 937 days.

(21) Appl. No.: 13/663,261

(22) Filed: Oct. 29, 2012

(65) Prior Publication Data

US 2014/0123170 A1    May 1, 2014

(51) Int. Cl.
*H04N 21/2347* (2011.01)
*H04N 21/258* (2011.01)
(Continued)

(52) U.S. Cl.
CPC ... *H04N 21/2347* (2013.01); *H04N 21/23476* (2013.01); *H04N 21/25816* (2013.01);
(Continued)

(58) Field of Classification Search
CPC ......... H04N 21/42204; H04N 21/4181; H04N 21/2347; H04N 21/23476;
(Continued)

(56) References Cited

U.S. PATENT DOCUMENTS 5,412,730 A    5/1995  Jones
6,055,314 A *  4/2000  Spies et al. ............ 380/228
(Continued)

FOREIGN PATENT DOCUMENTS

EP    0 843 449 A2    5/1998
EP    1 150 506 A2    10/2001

OTHER PUBLICATIONS

International Search Report for corresponding International Application No. PCT/US2013/067137, mailed Jan. 23, 2014, 5 pages.
(Continued)

*Primary Examiner* — Nathan Flynn
*Assistant Examiner* — Alexander Q Huerta
(74) *Attorney, Agent, or Firm* — Seed IP Law Group LLP

(57) ABSTRACT

A system for securely providing streaming media content on-demand may include a plurality of receiving devices in which each receiving device may request the same or different streaming media content (e.g., stored at a content storage system of a content delivery network) on-demand using VOD or other available on-demand services and/or applications associated with, in communication with or running on the respective receiving devices. In response, the content storage system of the content delivery network will encrypt the requested content uniquely for each received request (e.g., according to an encryption key that is unique for each or virtually each request) and deliver the encrypted requested content to the appropriate respective receiving device of the receiving devices. The respective receiving devices will then each decrypt the streaming content as it is being received according to the corresponding decryption key communicated from a respective individual secure remote to the respective receiving device.

27 Claims, 8 Drawing Sheets

(51) Int. Cl.
- *H04N 21/266* (2011.01)
- *H04N 21/41* (2011.01)
- *H04N 21/418* (2011.01)
- *H04N 21/422* (2011.01)
- *H04N 21/4405* (2011.01)
- *H04N 21/472* (2011.01)
- *H04N 21/6334* (2011.01)

(52) U.S. Cl.
CPC ... *H04N 21/26613* (2013.01); *H04N 21/4126* (2013.01); *H04N 21/4181* (2013.01); *H04N 21/4182* (2013.01); *H04N 21/42206* (2013.01); *H04N 21/4405* (2013.01); *H04N 21/44055* (2013.01); *H04N 21/472* (2013.01); *H04N 21/63345* (2013.01)

(58) Field of Classification Search
CPC ....... H04N 21/25816; H04N 21/26613; H04N 21/4126; H04N 21/4182; H04N 21/42206
USPC ..................... 725/31, 86–87, 133
See application file for complete search history.

(56) References Cited

U.S. PATENT DOCUMENTS

| | | | |
|---|---|---|---|
| 6,804,357 B1 * | 10/2004 | Ikonen et al. | 380/241 |
| 6,993,134 B1 * | 1/2006 | Epstein | 380/262 |
| 7,926,078 B2 | 4/2011 | Arsenault et al. | |
| 2001/0016836 A1 | 8/2001 | Boccon-Gibod et al. | |
| 2004/0098597 A1 * | 5/2004 | Giobbi | G06F 21/10 713/185 |
| 2005/0013437 A1 * | 1/2005 | Ikonen | H04N 7/1675 380/241 |
| 2005/0195979 A1 * | 9/2005 | Arling | H04L 9/12 380/274 |
| 2006/0085821 A9 | 4/2006 | Simmons et al. | |
| 2006/0150211 A1 | 7/2006 | Ritter | |
| 2007/0118762 A1 | 5/2007 | Master et al. | |
| 2007/0217612 A1 | 9/2007 | So | |
| 2010/0020963 A1 * | 1/2010 | Candelore | H04N 7/163 380/43 |
| 2010/0297978 A1 * | 11/2010 | Mcclenny | H04N 5/4403 455/344 |
| 2011/0231660 A1 * | 9/2011 | Kanungo | H04L 63/0435 713/168 |
| 2011/0246616 A1 | 10/2011 | Ronca et al. | |
| 2012/0051545 A1 * | 3/2012 | Kudelski | G06F 21/10 380/270 |

OTHER PUBLICATIONS

Anonymous; "Text of ISO/IEC JTC 1/SC 29 N; Information technology—Dynamic adaptive streaming over HTTP (DASH)—Part 4: Segment encryption and authentication"; MPEG Meeting; May 12, 2012; 22 pages.

Hartung et al.; "DRM Protected Dynamic Adaptive HTTP Streaming"; URL:http://www.hartung.fh-aachen.de/publications/ACM_MMSys2011_p277.pdf; retrieved from internet Jun. 3, 2013; 6 pages.

Pantos et al.; "HTTP Live Streaming; draft-pantos-http-live-streaming-10.txt"; Internet Engineering Task Force (IETF); Oct. 15, 2012; 38 pages.

ISR/Written Opinion for International Application No. PCT/US2014/018263; mailed Jun. 2, 2014; 13 pages.

* cited by examiner

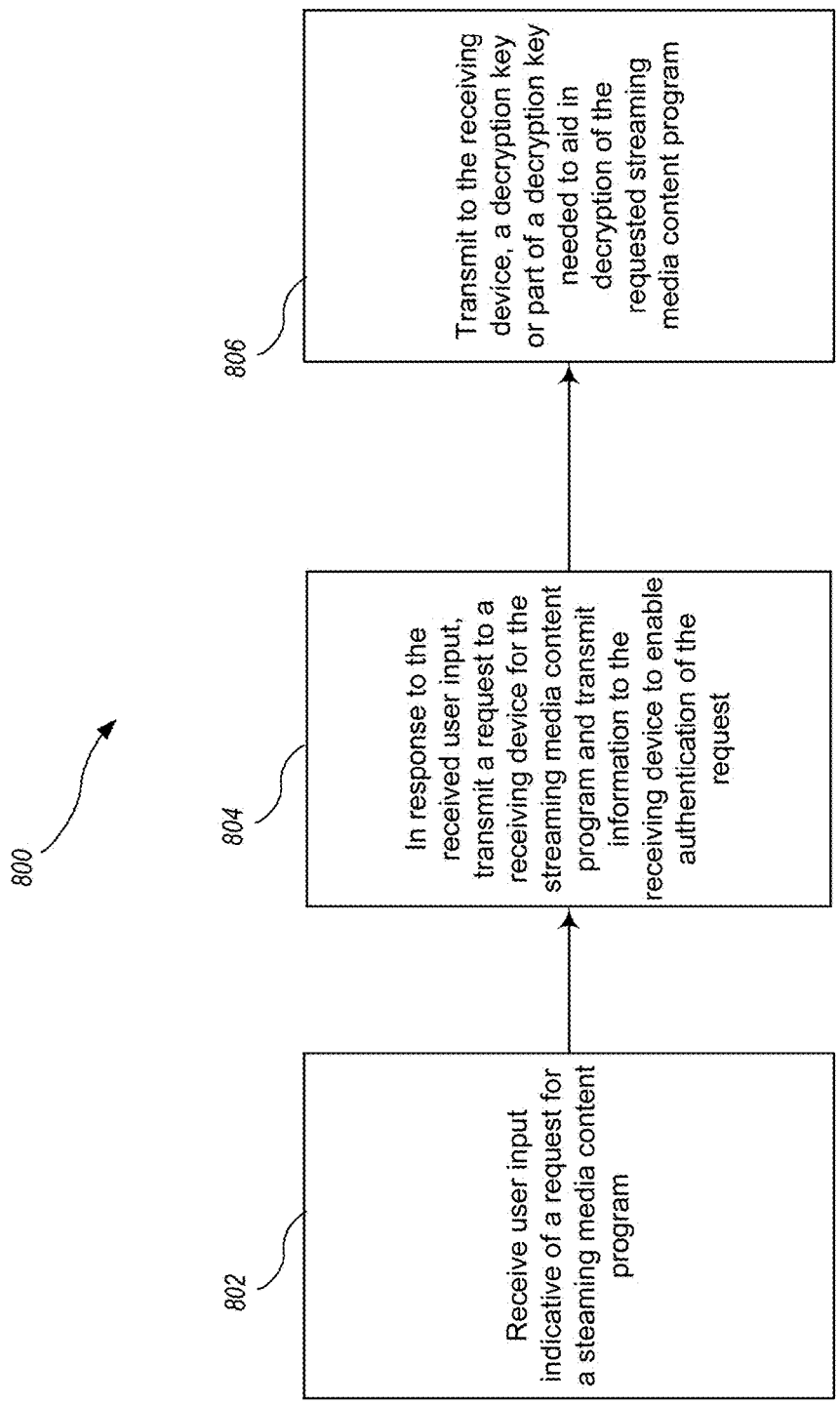

SYSTEMS AND METHODS FOR SECURELY PROVIDING STREAMING MEDIA CONTENT ON-DEMAND

TECHNICAL FIELD

The technical field relates to delivering media content, and particularly to providing media content securely to multiple different recipients.

BRIEF SUMMARY

Each of multiple receiving devices at various customer locations may request the same or different streaming media content (e.g., stored at a content storage system of a content delivery network) on-demand using video on-demand (VOD) or other available on-demand services and/or applications associated with, in communication with or running on the respective receiving devices. In response, the content storage system of the content delivery network will encrypt the requested content uniquely for each received request (e.g., according to an encryption key that is unique for each, or virtually each, request) and deliver the encrypted requested content to the appropriate respective receiving device of the receiving devices. The generation of the unique encryption key may be accomplished on a time-based rolling key change, an event-based rolling key change (e.g., per request, based on a pseudo random (PRN) number received from a respective individual secure remote control device), or a combination of both. The respective receiving devices will then each decrypt the streaming content as it is being received according to the corresponding decryption key, part of a decryption key, contribution key or pseudo random number, communicated from the respective individual secure remote to the respective receiving device in conjunction with the respective request.

BRIEF DESCRIPTION OF THE DRAWINGS

The components in the drawings are not necessarily to scale relative to each other. Like reference numerals designate corresponding parts throughout the several views.

FIG. 8 is a flow diagram of method of securely providing streaming media content on-demand from an example perspective of the example secure remote-control devices shown in FIG. 1, FIG. 3 and FIG. 4, according to one example embodiment.

DETAILED DESCRIPTION

Video on Demand (VOD) is a system which allows a user to select, watch and/or listen to video and audio content on demand. For example "Internet Television" and "Internet Protocol Television" (IPTV) are systems through which various media content is delivered using the Internet protocol (IP) suite over a packet-switched network such as the Internet, instead of being delivered through traditional channels using terrestrial, satellite signal, and cable television formats. In such situations, the device used to receive the content may often be other user equipment than the set-top box provided by the cable provider, satellite provider, or other program distributor to which the customer subscribes for such on-demand services. These may include various user devices such as a television, a digital video recorder (DVR), digital versatile disc (DVD) player, personal computer (PC), tablet device, game machine, smart phone, mobile device or other computing device or media player not provided by or controlled by the cable provider, satellite provider, or other program distributor to which the customer subscribes for the on-demand services. In such situations, it may be more difficult for the cable provider, satellite provider or program distributor to securely provide such on demand services to those devices because of the decryption which must usually occur at the device receiving the content in order to present the content to the user and due to there being no unique hardware or software control of such devices by the service provider or program distributor. However, the systems and methods described herein provide solutions which overcome this difficulty and enable the cable service provider, satellite service provider or other program distributor to more easily provide streaming media content to such devices in a secure manner using a secure remote control device of the user that may be provided or configured by the cable service provider, satellite service provider or other program distributor.

Figure 1:
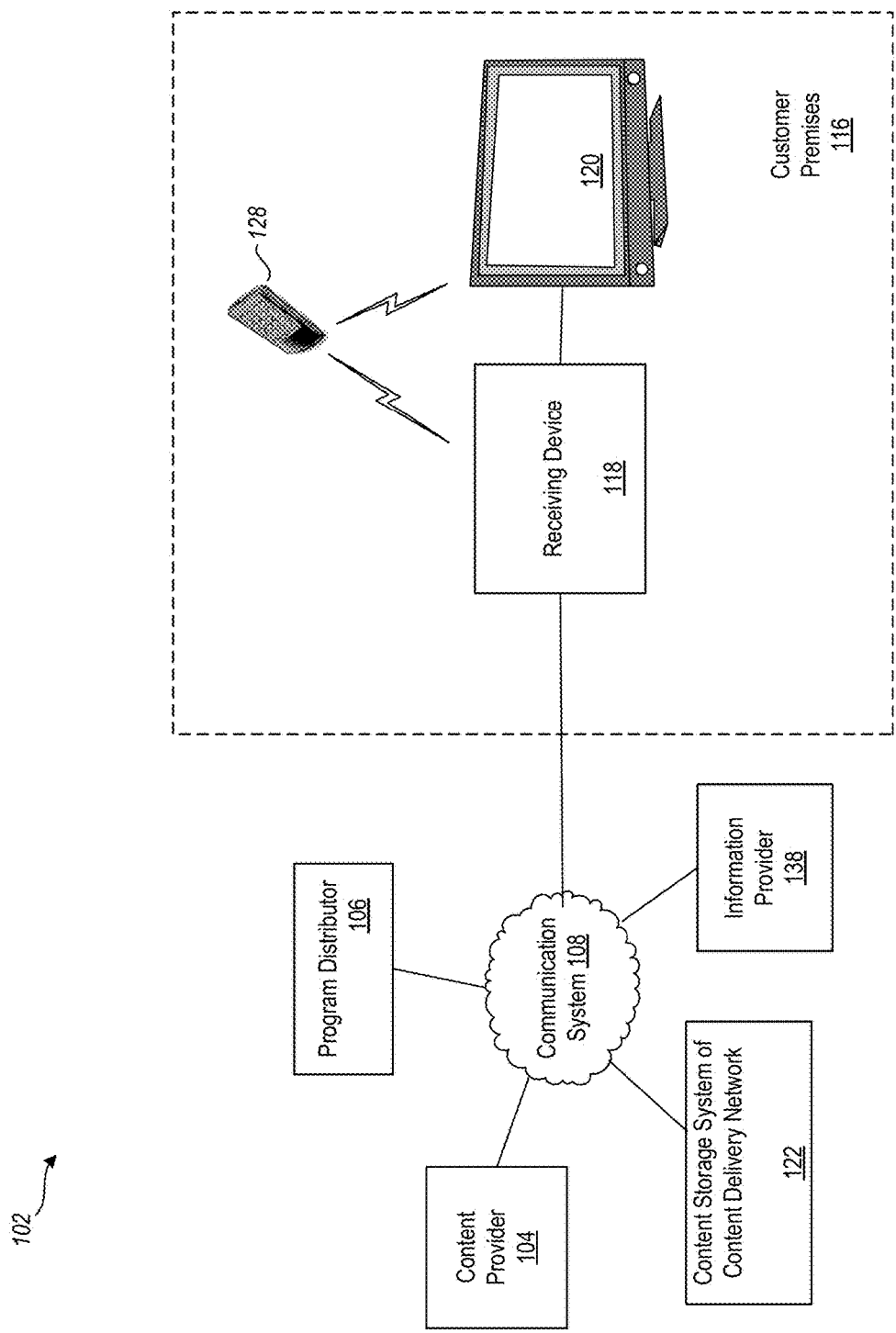
FIG. 1 is an overview block diagram illustrating an example content distribution environment in which embodiments of securely providing streaming media content on-demand may be implemented, according to one example embodiment.

FIG. 1 is an overview block diagram illustrating an example content distribution environment in which embodiments of securely providing streaming media content on-demand may be implemented, according to one example embodiment.

Before providing additional details regarding the operation and constitution of methods and systems for securely providing streaming media content on-demand, the example content distribution environment 102, within which such a system may operate, will briefly be described.

In the content distribution environment 102, audio, video, and/or data service providers, such as television service providers, provide their customers a multitude of video and/or data programming (hereafter, collectively and/or exclusively "programming"). Such programming is often provided by use of a receiving device 118 communicatively coupled to a presentation device 120 configured to receive the programming. The programming may include any type of media content, including, but not limited to: television shows, news, movies, sporting events, advertisements, etc. In various embodiments any of this programming may be provided as a type of programming referred to as streaming media content, which is generally digital multimedia data that is substantially constantly received by and presented to an end-user or presented on a device while being delivered by a provider from a stored file source. Its verb form, "to stream", refers to the process of delivering media in this manner. The term refers to how the media is delivered rather than the media itself.

The receiving device 118 interconnects to one or more communications media or sources. For example, the various media content may be delivered as data using the Internet protocol (IP) suite over a packet-switched network such as the Internet or other packet-switched network. The underlying connection carrying such data may be via a cable head-end, satellite antenna, telephone company switch, cellular telephone system, Ethernet portal, off-air antenna, or the like. The receiving device 118 may receive a plurality of programming by way of the communications media or sources, or may only receive programming via a particular channel or source described in greater detail below. In some embodiments, based upon selection by a user, the receiving device 118 processes and communicates the selected programming to the presentation device 120. Also, in some embodiments, the presentation device 120 may also be a receiving device 118 or have a receiving device 118 integrated within it.

For convenience, examples of a receiving device 118 may include, but are not limited to devices such as, or any combination of: a "television converter," "receiver," "set-top box," "television receiving device," "television receiver," "television," "television recording device," "satellite set-top box," "satellite receiver," "cable set-top box," "cable receiver," "media player," "digital video recorder (DVR)," "digital versatile disk (DVD) Player," "computer," "mobile device," "tablet computer," "smart phone," "MP3 Player," "handheld computer," and/or "television tuner," etc. Accordingly, the receiving device 118 may be any suitable converter device or electronic equipment that is operable to receive or playback programming. Further, the receiving device 118 may itself include user interface devices, such as buttons or switches. In some example embodiments, the receiving device 118 may be configured to receive and decrypt content according to various digital rights management (DRM) and other access control technologies and architectures as part of the process of securely providing streaming media content on-demand to the receiving device 118, which will be described in further detail below.

In many applications, a remote-control device ("remote") 128 is operable to control the receiving device 118 and/or the presentation device 120. The remote 128 typically communicates with the receiving device 118 using a suitable wireless medium, such as infrared ("IR"), radio frequency ("RF"), or the like, including, but not limited to devices using Bluetooth® wireless technology, Wi-Fi® wireless technology, Radio Frequency for Consumer Electronics (RF4CE) wireless technology, etc. In the present example embodiment, the remote 128 is a "secure" remote configured according to an example embodiment to enable securely providing streaming media content on-demand to the receiving device 118, which will be described in further detail below. In other embodiments, the secure remote 128 could instead or also be a smart phone, tablet or other device that could have a secure software program and/or hardware elements that would allow the service provider to use it with better security resources than the receiving device 118.

Examples of a presentation device 120 may include, but are not limited to, one or a combination of the following: a television ("TV"), a personal computer ("PC"), a sound system receiver, a digital video recorder ("DVR"), a compact disk ("CD") device, DVD Player, game system, tablet device, smart phone, mobile device or other computing device or media player, and the like. Presentation devices 120 employ a display, one or more speakers, and/or other output devices to communicate video and/or audio content to a user. In many implementations, one or more presentation devices 120 reside in or near a customer's premises 116 and are communicatively coupled, directly or indirectly, to the receiving device 118. Further, the receiving device 118 and the presentation device 120 may be integrated into a single device. Such a single device may have the above-described functionality of the receiving device 118 and the presentation device 120, or may even have additional functionality.

A content provider 104 provides program content, such as television content, to a distributor, such as the program distributor 106. Example content providers include television stations which provide local or national television programming and special content providers which provide premium based programming, pay-per-view programming and on-demand programming.

Program content (i.e., a program including or not including advertisements), is communicated to the program distributor 106 from the content provider 104 through suitable communication media, generally illustrated as communication system 108 for convenience. Communication system 108 may include many different types of communication media including those utilized by various different physical and logical channels of communication, now known or later developed. Non-limiting media and communication channel examples include one or more, or any operable combination of, telephone systems, the Internet, cable systems, fiber optic systems, microwave systems, asynchronous transfer mode ("ATM") systems, frame relay systems, digital subscriber line ("DSL") systems, radio frequency ("RF") systems, cellular systems, and satellite systems.

In at least one embodiment, the received program content is converted by the program distributor 106 into a suitable signal (a "program signal") that is ultimately communicated to the receiving device 118. Various embodiments of the receiving device 118 may instead receive programming from program distributors 106 and/or directly from content providers 104 via locally broadcast RF signals, cable, fiber optic, Internet media, or the like via the communication system 108, such as from the content storage system of a content delivery network 122.

For example, Video on Demand (VOD) systems may allow a user of the receiving device 118 to select, watch and/or listen to video and audio content on demand. For example "Internet Television" and "Internet Protocol Television" (IPTV) are systems through which various media content is delivered using the Internet protocol (IP) suite over a packet-switched network such as the Internet represented by communication system 108 to the receiving device 118, instead of being delivered through traditional channels using terrestrial, satellite signal, and cable television formats of the communication system 108. In various example embodiments, such technologies are deployed within the content distribution environment 102 such as in subscriber-based telecommunications networks of the communication system 108 with high-speed access channels into the customer premises 116 via the receiving device 118 (e.g., a set-top box or other customer-premises equipment) to bring VOD services to the customer premises 116.

In various example embodiments, television VOD systems stream media content via the communications system 108 from files stored at the content storage system of the content delivery network 122, under direct or indirect control of the program distributor 106, to the receiving device 118. The content storage system of the content delivery network 122 may also comprise multiple separate storage facilities and streaming media content servers geographically separated from each other, each of which (also referred to as an "edge cache") streams stored media content to particular customer locations based on a number of factors such as proximity of the customer premises 116 to the individual content storage system of the content delivery network 122 location or edge cache, load balancing parameters, current demand on the individual content storage system of the content delivery network 122, capacity of the individual content storage system of the content delivery network 122, etc.

Television VOD systems may stream content to a receiving device 118 such as a set-top box, DVD player, game system, smart phone, television (including a smart TV), PC, a sound system receiver, a digital video recorder ("DVR"), a compact disk ("CD") device, tablet device, mobile device or other computing device or media player, and the like, allowing viewing in real time at the customer premises 116, or download it to a receiving device 118 such as a computer, DVR (also called a personal video recorder) or portable media player for viewing at any time. The program distributor 106 may offer VOD streaming, including pay-per-view and free content, whereby a user buys or selects a movie or television program and it begins to play on the presentation device 120 almost instantaneously, offer downloading of the media content to a DVR rented from the program distributor, and/or offer downloading the content onto a computer or mobile device, for viewing in the future.

In some embodiments, the receiving device 118 may be a set-top box that is typically provided by the cable provider, satellite provider, or other program distributor 106 to which the customer may subscribe to receive such on-demand services and that also receives programming through traditional channels using a terrestrial, satellite signal, and/or cable television format. However, in many embodiments, the receiving device 118 may instead be other user equipment than the set-top box such as a television, DVR, DVD player, Tablet, PC, Smart Phone or other media player not provided by or controlled by the cable provider, satellite provider, or other program distributor 106 to which the customer subscribes for such on-demand services. In such situations where the receiving device 118 is not provided by or controlled by the cable provider, satellite provider, or other program distributor 106 to which the customer subscribes for such on-demand services, it may be more difficult for the program distributor 106 to securely provide such on demand services to those devices because of the decryption which must usually occur at the receiving device in order to present the content to the user and due to there being no unique hardware or software control of such devices by the program distributor 106 or other service provider. However, the systems and methods described herein for securely providing streaming media content on-demand provide solutions which overcome this difficulty and enables program distributors to more easily securely providing streaming media content to such devices.

In addition, information provider 138 may provide various forms of content and/or services to various devices residing in the customer premises 116. For example, Information provider 138 may also provide information to the receiving device 118 regarding insertion of advertisement or other additional content or metadata into a media content segment provided to the receiving device 118. In some embodiments, such advertisements or other additional content or metadata may be provided by an advertisement server to the content provider 104, directly to the receiving device 118 or be inserted into the streaming media stored on the content storage system of the content delivery network 122 or as it is being streamed to the receiving device 118. The information provider 138 may also or instead be another third party entity providing security data and/or services related to authentication, encryption, digital media rights, etc., on behalf of the program distributor 106 or other authorized entity.

In the illustrated example, one or more of the content provider 104, information provider 138 and/or content storage system of the content delivery network 122 may also transmit and receive additional information than the streaming media content to and from the receiving device 118 over one or more channels within the communication system 108. For example, the content provider 104, information provider 138 and/or content storage system of the content delivery network 122 may transmit and receive indications to and from the receiving device 118 regarding encryption or decryption of the streaming media content (e.g., encryption or decryption keys), requests for streaming media content programs, identification of the user or user account, identification of the receiving device, authentication information, information related to digital media rights of the streaming media content, additional metadata, etc. Some or all of this additional information and metadata may also be encrypted.

For example, a user at the customer premises 116 may use the secure remote 128, which is provided to the user by the program distributor 106 or other VOD service provider, to order a VOD program via the receiving device 118 using a VOD and/or other software application running thereon. The receiving device 118 may transmit the VOD request for the ordered program to the content storage system of the content delivery network 122 or to the program distributor 106, which is then ultimately received by the content storage system of the content delivery network 122. In conjunction with this request the secure remote 128 may send a unique code associated with the secure remote 128 (and thus the user) to the content storage system of the content delivery network 122 via the receiving device 118. If the request is approved and/or authenticated based on the unique code, the content storage system of the content delivery network 122 will then encrypt and send the requested streaming video content to the receiving device 118 using a new encryption key which changes at set time intervals and/or for each request based on a specific encryption/decryption key pair algorithm. In one embodiment, the secure remote 128 has this same encryption/decryption key pair algorithm to generate the corresponding decryption key, which also changes at the same set time intervals and/or for each request in the same manner. The user uses the secure remote 128 to communicate the decryption key to the receiving device 118 such that it can decrypt the received streaming media program. Thus, the encryption/decryption key pair used is different for each streaming media session to each receiving device 118 of each user, thereby increasing the security and protection of the streaming media content being sent. In one example embodiment, only particular streaming media content programs of all those available on-demand and/or only portions (e.g., a pre-determined percentage such as 10% or 20%, etc.) of streaming media content programs available on-demand are encrypted using the unique encryption key, contribution key, partial key and/or pseudo-random number provided by the secure remote 128 as described herein. For example, this may be to provide additional security for particular higher value content, to allocate systems resources more efficiently and/or for other reasons as desirable by the program distributor 106.

Also, different specific key generation algorithms may be used by the content storage system of the content delivery network 122 for various different secure remotes. Thus, identification of the specific secure remote 128 with which the request is associated enables the content storage system of the content delivery network 122 to know which specific key generation algorithm is used for generation of the encryption keys for the specific secure remote 128.

In other embodiments, there may be an association made between the receiving device 118 and the secure remote 128 that is communicated by the program distributor 106 or customer to the content storage system of the content delivery network 122, or is otherwise known or stored by the content storage system of the content delivery network 122 such that an identification of the receiving device 118 (such as by an IP address, or other identifier of the receiving device 118) may instead or also be sent to the content storage system of the content delivery network 122 in conjunction with the request for on-demand content. Thus, in this embodiment, the secure remote 128 would not need to also send a code or other identifier to the receiving device 118 to be forwarded to the content storage system of the content delivery network 122 each time in conjunction with the user using the secure remote 128 to order the streaming media content program. Thus, identification of the specific receiving device 118 associated with a secure remote 128 as verified by the content storage system of the content delivery network 122 enables the content storage system of the content delivery network 122 to know which specific key generation algorithm is used for generation of the encryption key individually for the specific secure remote 128.

In an alternative embodiment, if the encryption/decryption key pair is set to change just based on set time intervals, each secure remote 128 of each user may be set on the same time interval and to use the same key generation algorithm as that of the content delivery network. Thus, the individual secure remotes need not be identified by the content storage system of the content delivery network 122 and the secure remote 128 need not send an identification code.

In another alternative embodiment, each secure remote 128 of each user may generate a pseudo random number (PRN) and communicate this PRN to the receiving device 118 and/or to the content storage system of the content delivery network 122 for each request. If the receiving device 118 receives the PRN from the secure remote 128, then the receiving device 118 communicates this PRN to the content storage system of the content delivery network 122 for each request. Once the content storage system of the content delivery network 122 receives the PRN associated with the request from either the receiving device 118 or the secure remote 128, the content storage system of the content delivery network 122 then generates an encryption key based on the received PRN. In response to the request, the content storage system of the content delivery network 122 then encrypts the requested content (or portion thereof) using the encryption key generated based on the received PRN and communicates the encrypted content to the receiving device 118. This results in a unique PRN, and thus unique encryption key used, for virtually every request, depending on the length of the PRN used and thus, increases security for the transmission of requested content.

The receiving device 118 then decrypts the encrypted content using a corresponding decryption key communicated from the secure remote 128 to the receiving device 118. The receiving device 118 may instead receive a part or portion of the decryption key, a contribution key and/or the PRN communicated from the secure remote 128 to the receiving device 118 and use it to decrypts the encrypted content. In the instances where only a part or portion of the decryption key, a contribution key and/or the PRN is communicated from the secure remote 128 to the receiving device 118, the receiving device may receive other information from the content delivery network 122 or other source necessary to derive the complete decryption key from or supplement the part or portion of the decryption key, the contribution key and/or the PRN communicated from the secure remote 128 to obtain the complete decryption key necessary to decrypt the content. In some embodiments, the PRN may serve as the decryption key itself. The decryption key, the part or portion of the decryption key, the contribution key and/or the PRN may also be encrypted before transmission from the secure remote 128 to the receiving device 118 and/or to the content storage system of the content delivery network 122 and then decrypted by the receiving device 118.

Alternatively, the content storage system of the content delivery network 122 may generate a PRN, generate an encryption key based on this PRN and transmit content encrypted using this encryption key to the receiving device 118 in response to receiving the request. This PRN may be communicated to the secure remote 128 via a network to which the secure remote 128 is communicatively coupled or via the receiving device 118. The secure remote 128 then generates the decryption key based on this PRN and communicates this decryption key to the receiving device 118 to decrypt the encrypted content that is received from the content storage system of the content delivery network 122 in response to the request.

Encryption and decryption described herein may be performed as applicable according to one or more of any number of currently available or subsequently developed encryption methods, processes, standards and/or algorithms including, but not limited to: encryption processes utilizing a public-key infrastructure (PKI), encryption processes utilizing digital certificates, the Data Encryption Standard (DES), the Advanced Encryption Standard (AES 128, AES 192, AES 256, etc.), the Common Scrambling Algorithm (CSA), encryption algorithms supporting Transport Layer Security 1.0, 1.1, and/or 1.2, encryption algorithms supporting the Extended Validation (EV) Certificate, etc.

The above description of the content distribution environment 102, the customer premises 116, and the various devices therein, is intended as a broad, non-limiting overview of an example environment in which various embodiments of securely providing streaming media content on-demand may be implemented. FIG. 1 illustrates just one example of a content distribution environment 102 and the various embodiments discussed herein are not limited to such environments. In particular, content distribution environment 102 and the various devices therein, may contain other devices, systems and/or media not specifically described herein.

Example embodiments described herein provide applications, tools, data structures and other support to implement securely providing streaming media content on-demand. Other embodiments of the described techniques may be used for other purposes, including securely providing streaming media content on-demand to be played on various other receiving devices, such as audio and DVD players, digital recorders, computers, peripherals, televisions, mobile devices, telephones, and other electronic devices, etc. In the following description, numerous specific details are set forth, such as data formats, program sequences, processes, and the like, in order to provide a thorough understanding of the described techniques. The embodiments described also can be practiced without some of the specific details described herein, or with other specific details, such as changes with respect to the ordering of the code flow, different code flows, and the like. Thus, the scope of the techniques and/or functions described are not limited by the particular order, selection, or decomposition of steps described with reference to any particular module, component, or routine.

Figure 2:
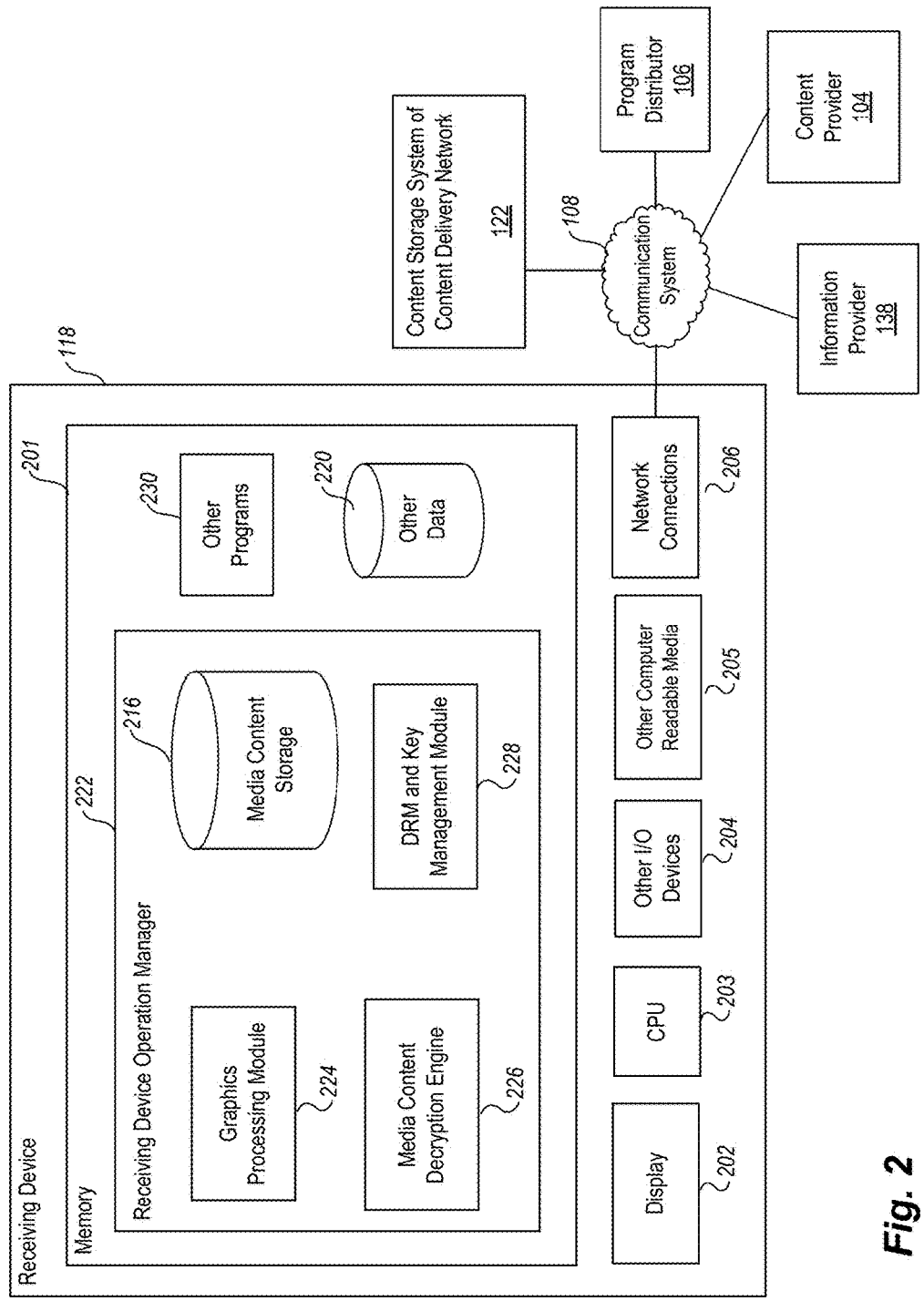
FIG. 2 is a block diagram illustrating elements of an example receiving device used in securely providing streaming media content on-demand, according to one example embodiment.

FIG. 2 is a block diagram illustrating elements of an example receiving device used in securely providing streaming media content on-demand, according to one example embodiment.

In one embodiment, the receiving device 118 is a device such as a television, DVR, DVD player, PC, tablet device, game machine, smart phone, mobile device or other computing device or media player configured to receive and process streaming media content programs and to display such programming on a presentation device. In other embodiments, the receiving device 118 is a set-top box configured to receive, process and display on a presentation device streaming media content programs and/or other programming such as cable or satellite television broadcasts via various other physical and logical channels of communication.

Note that one or more general purpose or special purpose computing systems/devices may be used to operate the receiving device 118; store information regarding the receiving device 118, store metadata, perform DRM and key management operations, decrypt received content; and communicate with the content provider 104, secure remote 128, program distributor 106, information provider 138 and/or content storage system of the content delivery network 122. In addition, the receiving device 118 may comprise one or more distinct computing systems/devices and may span distributed locations. Furthermore, each block shown may represent one or more such blocks as appropriate to a specific embodiment or may be combined with other blocks. Also, the receiving device operation manager 222 may be implemented in software, hardware, firmware, or in some combination to achieve the capabilities described herein.

In the embodiment shown, receiving device 118 comprises a computer memory ("memory") 201, a display 202 (including, but not limited to a light emitting diode (LED) panel, cathode ray tube (CRT) display, liquid crystal display (LCD), touch screen display, etc.), one or more Central Processing Units ("CPU") 203, Input/Output devices 204 (e.g., keyboard, mouse, RF or infrared receiver, universal serial bus (USB) ports, other communication ports, and the like), other computer-readable media 205, and network connections 206. The receiving device operation manager 222 is shown residing in memory 201. In other embodiments, some portion of the contents and some, or all, of the components of the receiving device operation manager 222 may be stored on and/or transmitted over the other computer-readable media 205. The components of the receiving device 118 and operation manager 222 preferably execute on one or more CPUs 203 and facilitate the receiving, decrypting, decoding, processing, selecting, recording, playback and displaying of programming, as described herein. The receiving device operation manager 222 may also facilitate on-demand media services (e.g., VOD services), on-demand program ordering, processing and DRM and key management and storage corresponding to processing received streaming media content and other programming. The receiving device operation manager 222 may operate as, be part of, or work in conjunction and/or cooperation with various on-demand service software applications stored in memory 201. The receiving device operation manager 222 also facilitates communication with peripheral devices and the secure remote 128, via the I/O devices 204 and with remote systems (e.g., the content provider 104, the content storage system of the content delivery network 122, the program distributor 106, and/or the information provider 138) via the network connections 206.

Recorded or buffered programming received as streaming media content or other types of programming may reside on the media content storage 215, either in decrypted or encrypted form as applicable for securely storing, processing and displaying of the received media content according to the applicable DRM associated with the particular programming. The media content storage 215 may also store various program metadata associated with the recorded or buffered programming stored in the media content storage 215, such as that including, but not limited to, DRM data, tags, codes, identifiers, format indicators, timestamps, user identifications, authorization codes, digital signatures, etc.

The DRM and key management module 228 is configured to store decryption keys and other authorization or identification codes as applicable in a secure area of the memory 201 and enable the receiving device 118 to execute the DRM policies and rules associated with received media content. The DRM and key management module 228 may be part of or work in conjunction with various on-demand service (e.g., VOD) software applications used to enable a user to order streaming media content programs and other programming via the receiving device 118.

The media content decryption engine 226 is configured to decrypt streaming media content as it is being received by the receiving device 118 using the applicable decryption key(s) stored by the DRM and key management module according to the DRM and/or VOD software application also residing in memory 201 or other memory 230.

The graphics processing module 224 is configured to process the decrypted streaming media content and render the data for display on a particular presentation device according to specifications and requirements of the presentation device. The graphics processing module 224 may decode, decompress, format, translate, perform digital signal processing, adjust data rate and/or complexity or perform other processing on the data representing received streaming media content as applicable for presenting the received content in real time on the presentation device as it is being received by the receiving device 118.

Other code or programs 230 (e.g., further audio/video processing modules, a program guide manager module, a Web server, and the like), and potentially other data repositories, such as data repository 220 for storing other data (user profiles, preferences and configuration data, etc.), also reside in the memory 201, and preferably execute on one or more CPUs 203. Of note, one or more of the components in FIG. 2 may or may not be present in any specific implementation. For example, some embodiments may not provide other computer readable media 205 or a display 202.

In some embodiments, the receiving device 118 and operation manager 222 includes an application program interface ("API") that provides programmatic access to one or more functions of the receiving device 118 and operation manager 222. For example, such an API may provide a programmatic interface to one or more functions of the receiving device operation manager 222 that may be invoked by one of the other programs 230, the secure remote 128, the program distributor 106, the content provider 104, information provider 138, content storage system of the content delivery network 122 or some other module. In this manner, the API may facilitate the development of third-party software, such as various different on-demand service applications, user interfaces, plug-ins, adapters (e.g., for integrating functions of the receiving device operation manager 222 and information provider 138 into desktop applications), and the like to facilitate securely providing streaming media content on-demand using the receiving device 118.

In an example embodiment, components/modules of the receiving device 118 and operation manager 222 are implemented using standard programming techniques. For example, the receiving device operation manager 222 may be implemented as a "native" executable running on the CPU 203, along with one or more static or dynamic libraries. In other embodiments, the receiving device 118 and operation manager 222 may be implemented as instructions processed by a virtual machine that executes as one of the other programs 230. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the receiving device 118 to perform the functions of the receiving device operation manager 222. In one embodiment, instructions cause the CPU 203 or some other processor, such as an I/O controller/processor, to receive decryption keys, access codes, identifications codes, etc., from external devices such as wirelessly from the secure remote 128 or other external secure device, and to decrypt or descramble such received information as applicable and transmit one or more of such codes with or in conjunction with transmitting a request for a streaming media program to a remote system according to on-demand service software applications running on the receiving device 118. The instructions cause the CPU 203 or some other processor, such as an I/O controller/processor, to receive, decrypt and process the requested streaming media program for display on a presentation device using the received decryption key.

The embodiments described above may also use well-known or other synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multi-threading, client-server, or peer-to-peer (e.g., Bluetooth® wireless technology providing a communication channel between the receiving device 118 and the secure remote 128), running on one or more computer systems each having one or more CPUs or other processors. Some embodiments may execute concurrently and asynchronously, and communicate using message passing techniques. Equivalent synchronous embodiments are also supported by a receiving device operation manager 222 implementation. Also, other functions could be implemented and/or performed by each component/module, and in different orders, and by different components/modules, yet still achieve the functions of the receiving device 118 and operation manager 222.

In addition, programming interfaces to the data stored as part of the receiving device 118 and operation manager 222, can be available by standard mechanisms such as through C, C++, C#, and Java APIs; libraries for accessing files, databases, or other data repositories; scripting languages such as XML; or Web servers, FTP servers, or other types of servers providing access to stored data. The media content storage 216 and other data 220 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the receiving device operation manager 222.

Furthermore, in some embodiments, some or all of the components of the receiving device 118 and operation manager 222 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques.

Figure 3:
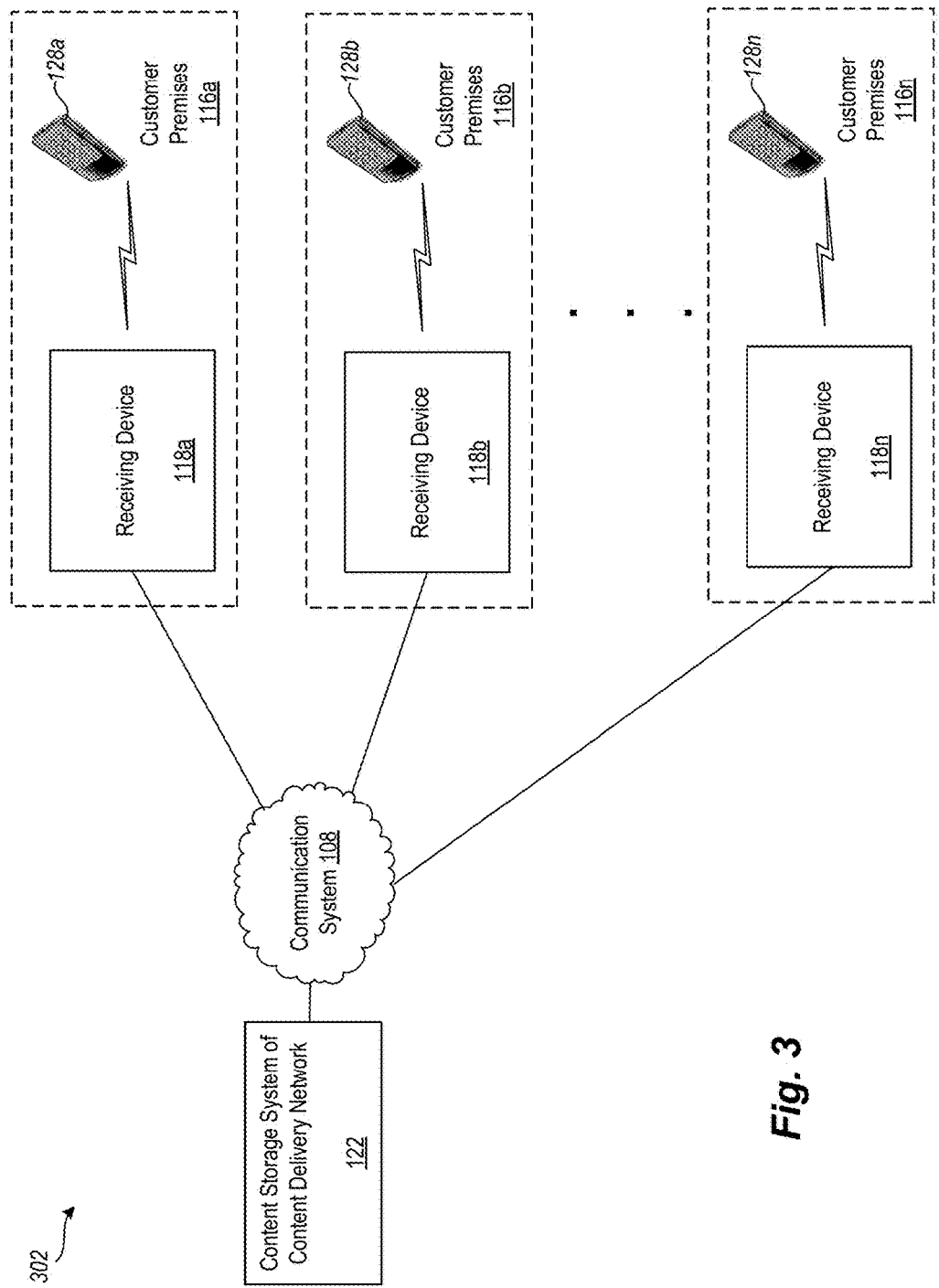
FIG. 3 is a block diagram of an example content storage system of a content delivery network in operable communication with multiple remote example receiving devices such as that of FIG. 2 to which streaming media content is securely provided on-demand, according to one example embodiment.

FIG. 3 is a block diagram of an example content storage system of a content delivery network 122 in operable communication with multiple remote example receiving devices 118a to 118n such as that of FIG. 2 to which streaming media content is securely provided on-demand, according to one example embodiment.

In one embodiment, the receiving devices 118a to 118n are not controlled or provided by the program distributor 106 or other entity providing the on-demand service via the content storage system of the content delivery network 122. For example, receiving devices 118a to 118n may be any combination of Internet connected televisions, DVRs, DVD players, PCs, tablet devices, game machines, smart phones, mobile devices or other computing devices or media players not controlled or provided by the program distributor 106 or other entity providing the on-demand service via the content storage system of the content delivery network 122. However, each receiving device 118a to 118n may request the same or different streaming media content (stored at the content storage system of the content delivery network 122) on-demand using VOD or other available on-demand services and/or applications associated with, in communication with or running on the respective receiving devices 118a to 118n. In response, the content storage system of the content delivery network 122 will encrypt the requested content uniquely for each received request (e.g., according to an encryption key that is unique for each request) and deliver the encrypted requested content to the appropriate respective receiving device of the receiving devices 118a to 118n. The respective receiving devices 118a to 118n will then each decrypt the streaming content as it is being received and cause it to be displayed according to the corresponding decryption key communicated from the respective individual remote 128a to 128n to the respective receiving device 118a to 118n in conjunction with the respective request.

For example, the user at customer premises 116a may use their individual secure remote 128a that was provided by the program distributor to order a movie on-demand to be delivered as streaming content to their respective receiving device 118a (e.g., their Internet-connected television) via communication system 108. The user selects the movie using their secure remote 128a from an electronic program guide (EPG) displayed on their television by pressing a button on their secure remote 128a. In response to pressing on this button, the secure remote then communicates an identification code (which may in many instances be sent in the clear or unencrypted manner) wirelessly to the receiving device 118a. However, the code may be otherwise transmitted by the secure remote 128a to the receiving device 118a in conjunction with the user operating the remote 128a to order the movie, such as by pressing a special designated button on the secure remote 128a different than that used to select the movie and/or a button pressed in response to a prompt displayed on the EPG.

The code may be provided wirelessly by the secure remote 128a to the receiving device 118a, such that the receiving device 118a can then transmit the code to the content storage system of the content delivery network 122 and/or program distributor 106 when the request for the streaming media content program is transmitted by the receiving device 118. In one embodiment, this unique code is unique to the secure remote 128a and may be pre-programmed and stored in the secure remote 128a (which may be manufactured, controlled, modified and/or provided to the user by the program distributor 106 or other entity providing or making available the on-demand service). The secure remote 128a is provided to the user who is uniquely associated with that code, and thus also the secure remote 128a, for authentication purposes to order the VOD programming. As stated above generally, in other alternative embodiments, there may be an association made between the receiving device 118a and the secure remote 128a that is communicated by the program distributor 106 or customer to the content storage system of the content delivery network 122, or is otherwise known or stored by the content storage system of the content delivery network 122 such that an identification of the receiving device 118 (such as by an IP address, or other identifier of the receiving device 118) may instead or also be sent to the content storage system of the content delivery network 122 in conjunction with the request for on-demand content. Thus, in this alternative embodiment, the secure remote 128 would not need to also send a code or other identifier to the receiving device 118 to be forwarded to the content storage system of the content delivery network 122 each time in conjunction with the user using the secure remote 128a to order the streaming media content program. Thus, identification of the specific receiving device 118a associated with a secure remote 128a as verified by the content storage system of the content delivery network 122 enables the content storage system of the content delivery network 122 to know which specific key generation algorithm and which sequence to use for generation of the encryption key individually for the specific request associated with the specific secure remote 128a.

Once the content storage system of the content delivery network 122 and/or program distributor 106 authenticates the request, such as by using the received code to associate the request with an authorized user or identifier of an authorized user, the content storage system of the content delivery network 122 may generate and/or use an encryption key uniquely associated with the code and uniquely associated with the specific occurrence of the received request to begin encrypting the requested on-demand movie and streaming the encrypted movie to the receiving device 118a. Thus, the encryption key used to encrypt the content is unique to the user associated with the code received from receiving device 118a. Also, the encryption key is uniquely associated with the specific occurrence of the received request in that the encryption key used also changes for each request or streaming media delivery session received from the various receiving devices 118a to 118n, thus increasing the security of the system such that leaked decryption keys will not be useful for subsequent sessions.

Such encryption key selection may be accomplished on a time-based rolling key change, an event-based rolling key change (e.g., per request), or a combination of both. For example, each time a request is received by the content storage system of the content delivery network 122 for a streaming media content program from any one of receiving devices 118a to 118n via the respective secure remote 128a to 128n, the encryption key for that request changes according to an encryption/decryption key pair generation algorithm that is used to generate the next key per authenticated request, or, the encryption key for that authenticated request may change according to an encryption/decryption key pair generation algorithm at pre-determined time intervals. In another embodiment, each secure remote 128a to 128n of each of the various respective receiving devices 118a to 118n may generate a pseudo random number (PRN) and communicate this PRN to the respective receiving device 118a to 118n and/or to the content storage system of the content delivery network 122 for each request. If the receiving device 118 receives the PRN from the secure remote 128, then the receiving device 118 communicates this PRN to the content storage system of the content delivery network 122 for each request. Once the content storage system of the content delivery network 122 receives the PRN associated with the request from either the receiving device 118 or the secure remote 128, the content storage system of the content delivery network 122 then generates an encryption key based on the received PRN. In response to the request, the content storage system of the content delivery network 122 then encrypts the requested content (or portion thereof) using the encryption key generated based on the received PRN and communicates the encrypted content to the receiving device 118. This results in a unique PRN, and thus unique encryption key used, for virtually every request from each of the receiving devices 118a to 118n, depending on the length of the PRN used and thus, increases security for the transmission of requested content.

In some embodiments, the authentication may occur at the receiving device 118a such that the receiving device 118a does not allow the request to be sent from the receiving device 118a, or the content may not be decrypted by the receiving device 118a unless and until the receiving device 118a authenticates or receives notice of authentication using the code received from the secure remote 128a in conjunction with VOD application software running on the receiving device 118. On other embodiments, the authentication may occur directly between the secure remote 128 and the content storage system of the content delivery network 122 and/or the program distributor 106 over the communication system 108, such as when the secure remote 128 is a smart phone or other wireless device with Wi-Fi® capability and the authentication occurs over the cellular telephone network or computer network such as the Internet.

In some embodiments, only particular streaming media content programs of all those available on-demand and/or only portions (e.g., a pre-determined percentage such as 10% or 20%) of streaming media content programs available on-demand are encrypted using the unique encryption key provided by the secure remote 128 as described herein. For example, this may be to provide additional security for particular higher value content, to allocate systems resources more efficiently and/or for other reasons as desirable by the program distributor 106 because the content storage system of the content delivery network 122 can uniquely encrypt less content than if it were to encrypt the entire program.

Figure 4:
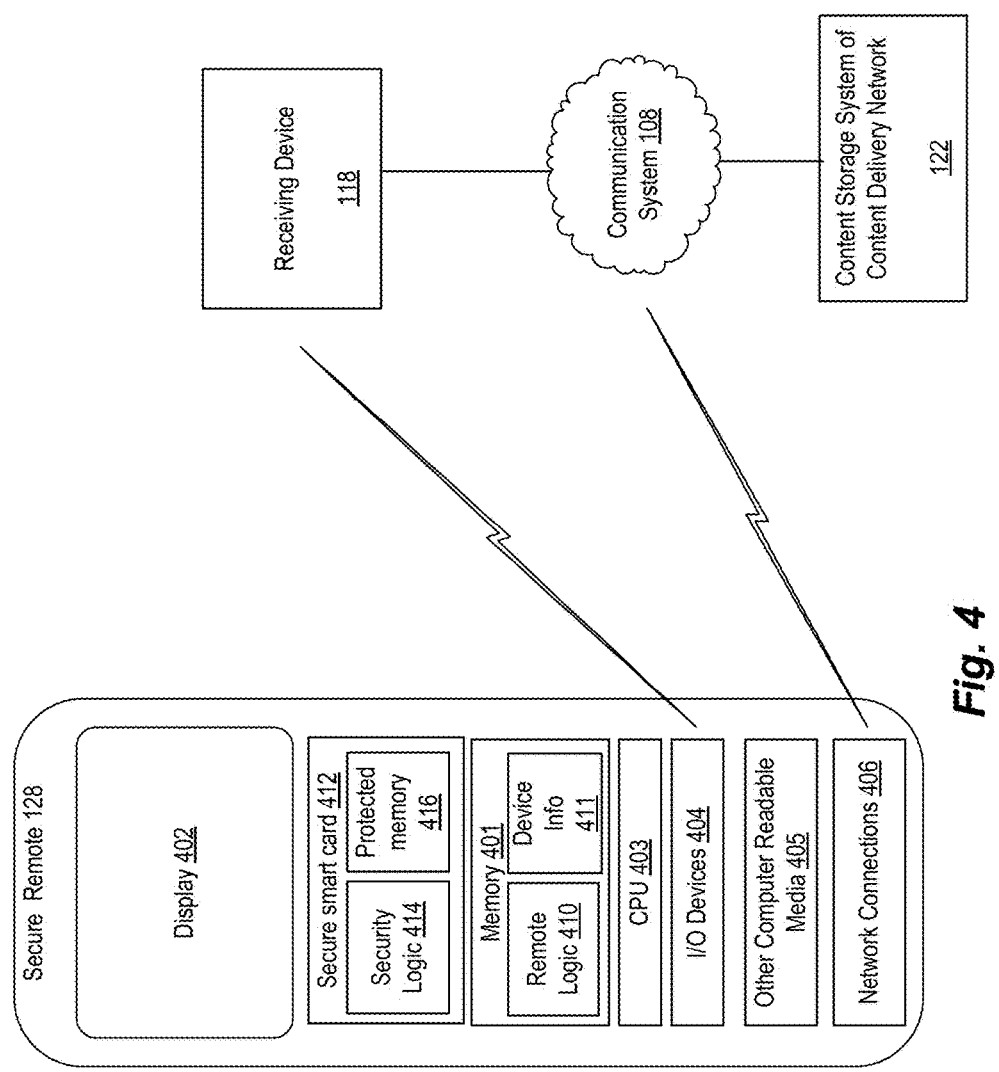
FIG. 4 is a block diagram illustrating components of an example embodiment of a secure remote-control device used in securely providing streaming media content on-demand in wireless communication with a receiving device and a presentation device, according to one example embodiment.

FIG. 4 is a block diagram illustrating components of an example embodiment of a secure remote-control device 128 used in securely providing streaming media content on-demand in wireless communication with a receiving device 118, according to one example embodiment.

In the embodiment shown, secure remote 128 comprises a computer memory ("memory") 401, a display 402, one or more Central Processing Units ("CPU") 403, other Input/Output devices 404 (e.g., keyboard, wheel input, touch pad), other computer-readable media 405 (e.g., flash memory, SIM card), and network connections 406. The display 402 may be, for example a bit-mapped LCD display, having sufficient resolution to display multiple lines of text and/or other user interface elements. The network connections 406 include one or more communication interfaces to various media devices, including but not limited to radio frequency transceivers, infrared transceivers, wireless Ethernet ("Wi-Fi") interfaces, and the like.

The secure remote 128 communicates with receiving device 118. The receiving device 118 may be a media device, television or any other device amenable to control by the secure remote 128. Example media devices include other remote-control devices, video recorders, audio systems, televisions, displays, personal computers, set-top boxes, mobile devices, and the like.

Secure remote logic 410 and device information 411 is shown residing in memory 401. In other embodiments, some portion of the contents, some of, or all of the components of the logic 410 may be stored on and/or transmitted over the other computer-readable media 405. The logic 410 preferably executes on one or more CPUs 403 and manages the secure remote 128, as described herein. Other code or programs and potentially other data/information (not shown), may also reside in the memory 401, and preferably execute on one or more CPUs 403. Of note, one or more of the components in FIG. 4 may not be present in any specific implementation. For example, some embodiments may not provide other computer readable media 405 and network connections 406.

The logic 410 performs the core functions of the secure remote 128 for controlling the receiving device 118 and also those functions as discussed with respect to FIG. 1 through FIG. 3 above. In particular, the logic 410 causes the appropriate decryption key or appropriate part of the decryption key to be sent to the receiving device 118 at the applicable time such that ordered streaming media content (such as that ordered using the secure remote 128) may be decrypted by the receiving device 118.

As stated previously herein, the generation of the unique encryption key used to encrypt the content, or portion of the content, may be accomplished on a time-based rolling key change, an event-based rolling key change (e.g., per request, based on a pseudo random (PRN) number received from a respective individual secure remote control device), or a combination of both. The respective receiving devices will then each decrypt the streaming content as it is being received according to the corresponding decryption key, part of a decryption key, contribution key or pseudo random number, communicated from the respective individual secure remote 128 to the respective receiving device 118 in conjunction with the respective request for the content.

In the present example embodiment, the secure remote 128 stores the decryption key (or part of the decryption key) in a secure protected memory area 416 such as in a secure smart card 412 within the secure remote 128 needed to decrypt the encrypted content received by the receiving device 118 from the content storage system of the content delivery network 122. For example, the security logic 414 stored on the secure smart card may cause this decryption key to change according to the same encryption/decryption key pair generation algorithm used by the content storage system of the content delivery network 122 for the particular user associated with the particular code that may also be stored in the protected memory 416 of the secure remote 128. Also, security logic 414 may be implemented using obfuscated code techniques, which is obfuscating computer program code (e.g., writing or generating the program code in a manner such that it is difficult for humans to understand) to conceal its purpose or its logic. This increases security by aiding in the prevention of tampering and deterring reverse engineering to gain access to the decryption key or other secret or sensitive data. The security logic 414 could also be fully or partially implemented using white box cryptography (WBC). For example, white box cryptography may use a special purpose code generator that turns a given cipher into a robust representation where the operations on the secret key are combined with random data and code in such a way that the random data cannot be distinguished from key information. In various embodiments, the security logic 414 may be hardware or software based, smart card based, or implemented using removable devices such as Secure Digital (SD) memory cards, secure personal information manager/management systems (PIMS) such as in cell phones, USB security devices, etc.

The secure remote 128 may send the decryption key to the receiving device 118 in response to a user selection of a button of the I/O devices 404 or other selection of an input selection item of the I/O devices 404 on the secure remote 128. The user may be prompted by the VOD application software on the receiving device 118 or other program guide displayed on the presentation device 120 to send the decryption key using the secure remote 128 at the appropriate time during the VOD ordering process. However, if the secure remote 128 is a two-way communication device such that it can receive communication signals from the receiving device 118, such as via the I/O devices 404 and/or network connections 406, the receiving device 118 may indicate automatically to the secure remote 128 when to transmit the decryption key and the secure remote 128 will then automatically transmit the decryption key accordingly. If the rolling encryption/decryption key pair is generated on an event based key generation system, then each time the secure remote 128 automatically transmits the decryption code, it will signal the encryption/decryption key pair generation algorithm to generate the next decryption code in the sequence in preparation for transmitting the next decryption key. Alternatively, the two-way secure remote 128 may generate the next decryption key in the sequence upon receiving a new request from the receiving device 118 to transmit the decryption key, or may just send the PRN generated as described above to the receiving device or directly to the content storage system of the content delivery network 122 via the network connections 406 if such are available in the secure remote 128. If the rolling encryption/decryption key pair is generated on a time based key generation system, then the decryption key is generated according to each determined time interval, or how much time has passed since the last key was generated in sequence with the encryption key generation at the content storage system of the content delivery network 122.

In an example embodiment, the logic 410 and security logic 414 are implemented using standard programming techniques. For example, the logic 410 may be implemented as a "native" executable running on the CPU 403, along with one or more static or dynamic libraries. In other embodiments, the logic 410 may be implemented as instructions processed by a virtual machine that executes as some other program. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), declarative (e.g., SQL, Prolog, and the like).

Also, security logic 414 could be implemented using obfuscated code techniques, which is obfuscating computer program code (e.g., writing or generating the program code in a manner such that it is difficult for humans to understand) to conceal its purpose or its logic. This increases security by aiding in the prevention of tampering and deterring reverse engineering to gain access to the decryption key or other secret or sensitive data. The security logic 414 could also be fully or partially implemented using white box cryptography (WBC). For example, white box cryptography may use a special purpose code generator that turns a given cipher into a robust representation where the operations on the secret key are combined with random data and code in such a way that the random data cannot be distinguished from key information. The security logic 414 may be hardware or software based, smart card based, or implemented using removable devices such as Secure Digital (SD) memory cards, secure personal information manager/management systems (PIMS) such as in cell phones, USB security devices, etc.

The embodiments described above may also use well-known or proprietary synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the functions of the smart remote.

In addition, programming interfaces to the data stored as part of the device information 411, can be available by standard mechanisms such as through C, C++, C#, and Java APIs; libraries for accessing files, databases, or other data repositories; through scripting languages such as XML; or through Web servers, FTP servers, or other types of servers providing access to stored data. The device information 411 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions of an HDM.

Furthermore, in some embodiments, some or all of the components/portions of the logic 410 and security logic 414 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Such computer program products may also take other forms in other embodiments. Accordingly, embodiments of the secure remote include other configurations. For example, the secure remote 128 may be, but is not limited to being, one or any combination of the following devices which may have a hardware or software security element: a mobile device (e.g., a smart phone or tablet device), a wireless device, a wireless device configured for two-way communication, a short range wireless device, a wireless device configured to use radio frequency wireless transmissions, a wireless device configured to use short-wave wireless transmissions, a wireless device configured to use infrared wireless transmissions, a wireless device configured to use sonic transmissions, a consumer electronics remote control device, an entertainment system remote control device, a universal remote control device, a set-top box remote control device, a television remote control device, a mobile telephone, a key fob, a universal serial bus a (USB) device, an access card, a flash memory device, a radio frequency identification device, a near filed communication device, a security token, etc.

Figure 5:
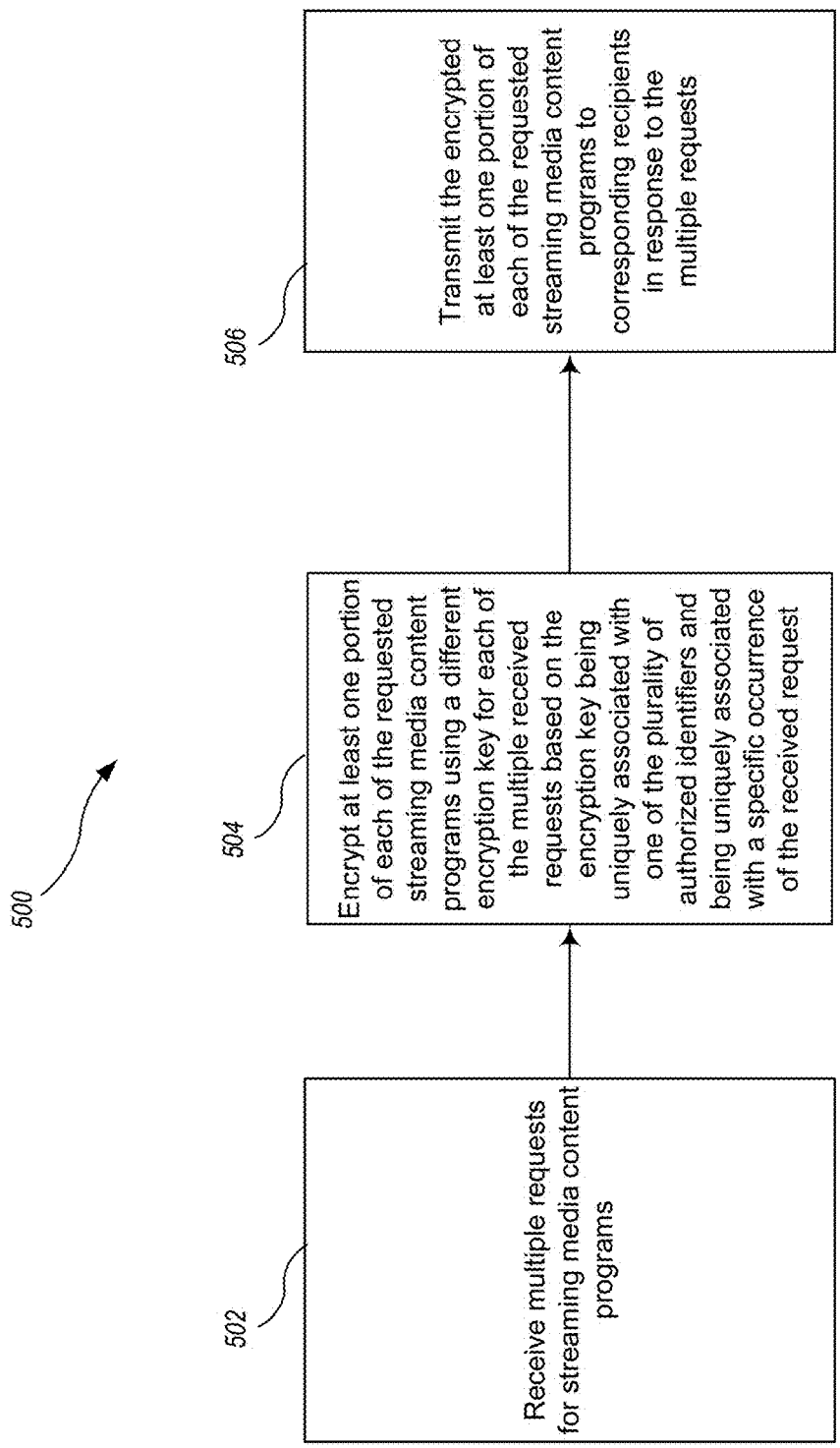
FIG. 5 is a flow diagram of method of securely providing streaming media content on-demand from an example perspective of the content storage system of the content delivery network shown in FIG. 1 through FIG. 4, according to one example embodiment.

FIG. 5 is a flow diagram of method 500 of securely providing streaming media content on-demand from an example perspective of the content storage system of the content delivery network 122 of the content delivery network shown in FIG. 1 through FIG. 3, according to one example embodiment.

At 502, the content storage system of the content delivery network 122 receives multiple requests for streaming media content programs.

At 504, the content storage system of the content delivery network 122 encrypts at least one portion of each of the requested streaming media content programs using a different encryption key for each of the multiple received requests based on the encryption key being uniquely associated with one of the plurality of authorized identifiers and being uniquely associated with a specific occurrence of the received request.

At 506, the content storage system of the content delivery network 122 transmits the encrypted at least one portion of each of the requested streaming media content programs to corresponding recipients in response to the multiple requests.

Figure 6:
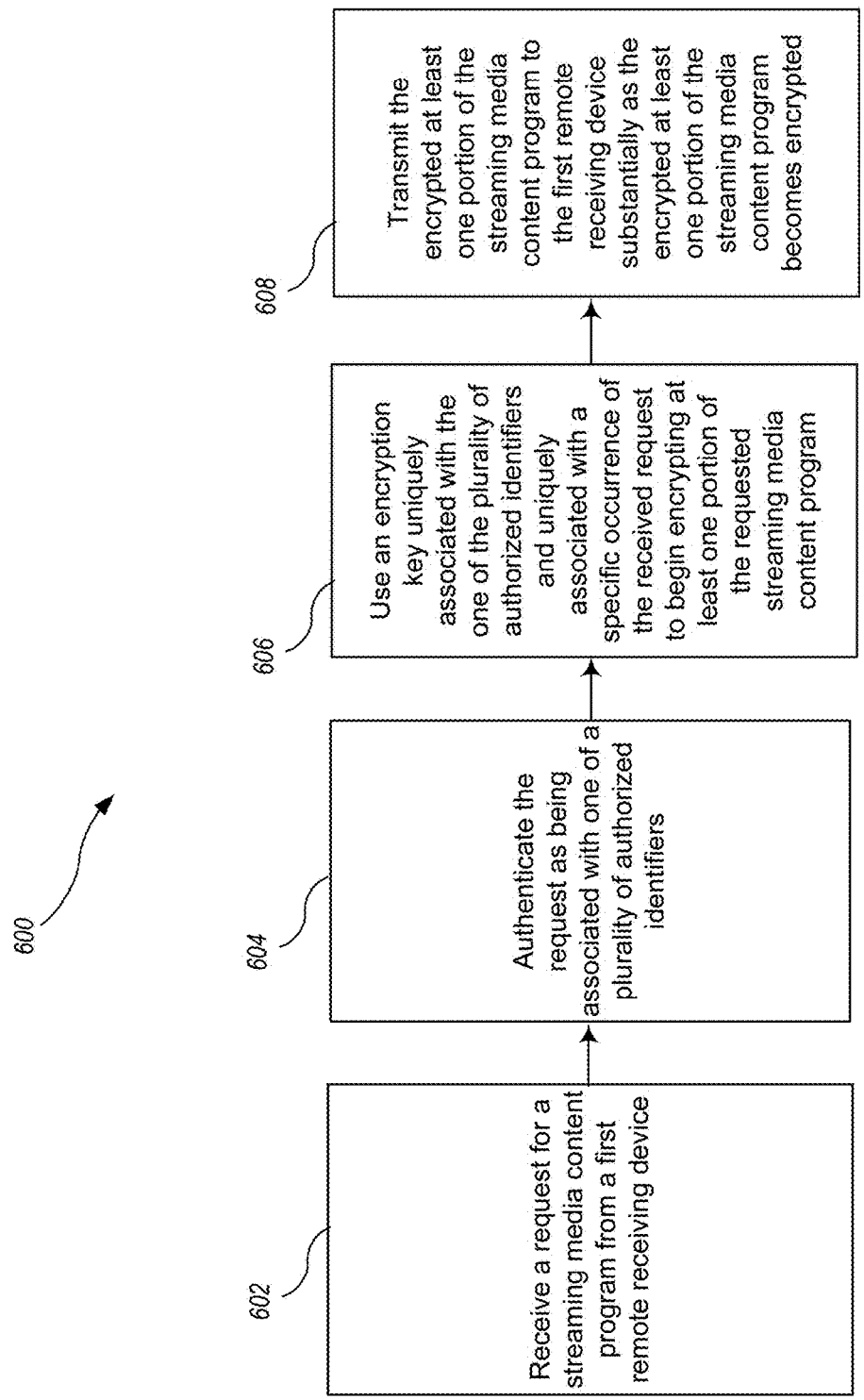
FIG. 6 is a flow diagram of a method providing some more details of securely providing streaming media content on-demand from an example perspective of the example content storage system of the content delivery network shown in FIG. 1 through FIG. 4, according to one example embodiment.

FIG. 6 is a flow diagram 600 of a method providing some more details of securely providing streaming media content on-demand from an example perspective of the example content storage system of the content delivery network 122 shown in FIG. 1 through FIG. 4, according to one example embodiment.

At 602, the content storage system of the content delivery network 122 receives a request for a streaming media content program from a remote receiving device 118.

At 604, the content storage system of the content delivery network 122 authenticates the request as being associated with an authorized identifier of a plurality of authorized identifiers.

At 606, the content storage system of the content delivery network 122 uses an encryption key uniquely associated with the authorized identifier and uniquely associated with a specific occurrence of the received request to begin encrypting at least one portion of the requested streaming media content program.

At 608, the content storage system of the content delivery network 122 transmits the encrypted at least one portion of the streaming media content program to the first remote receiving device substantially as the encrypted at least one portion of the streaming media content program becomes encrypted.

Figure 7:
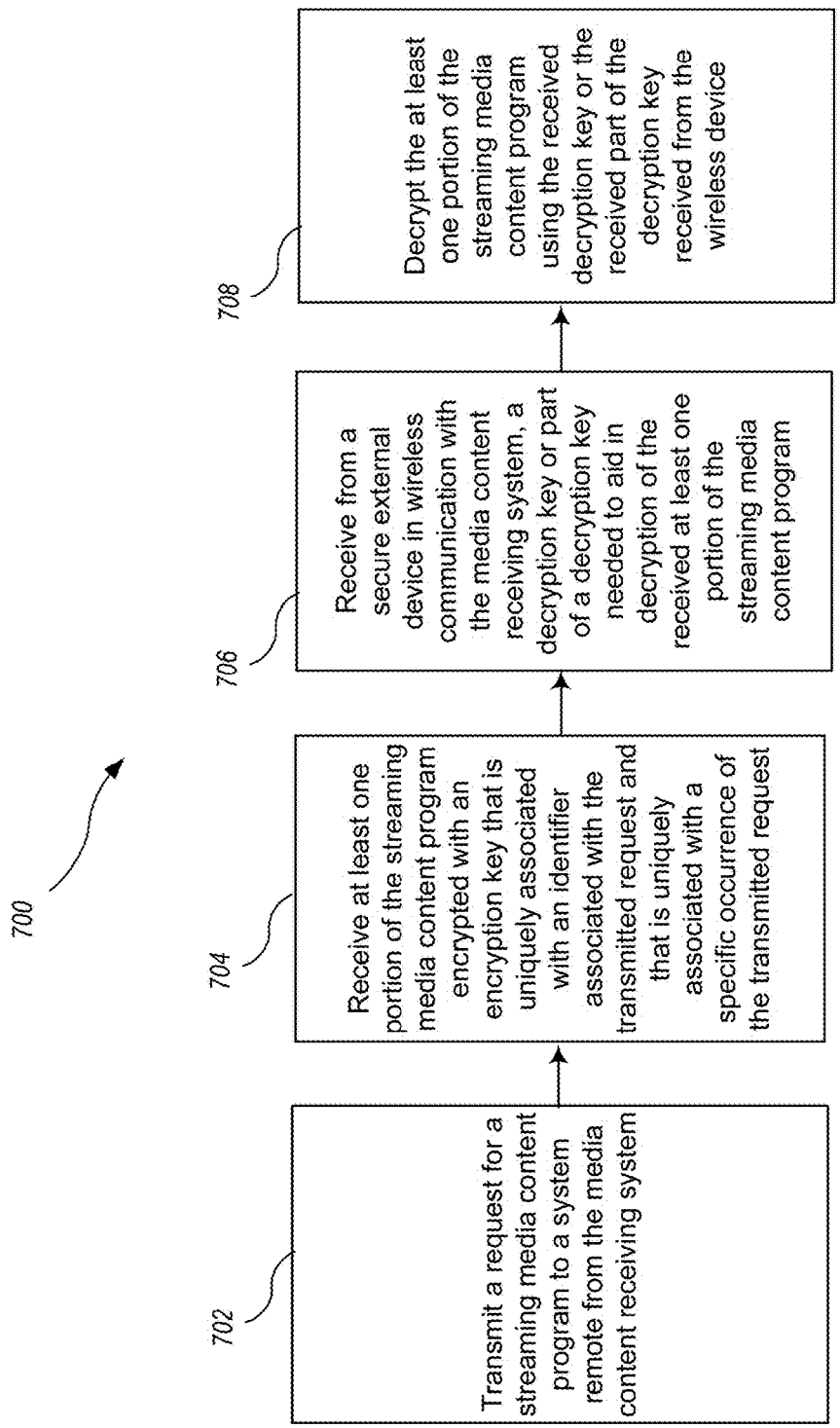
FIG. 7 is a flow diagram of method of securely providing streaming media content on-demand from an example perspective of the example receiving devices shown in FIG. 1 through FIG. 4, according to one example embodiment.

FIG. 7 is a flow diagram of method 700 of securely providing streaming media content on-demand from an example perspective of the example receiving devices shown in FIG. 1 through FIG. 4, according to one example embodiment.

At 702, the receiving device 118 transmits a request for a streaming media content program to a system remote from the media content receiving system.

At 704, the receiving device 118 receives at least one portion of the streaming media content program encrypted with an encryption key that is uniquely associated with an identifier associated with the transmitted request and that is uniquely associated with a specific occurrence of the transmitted request.

At 706, the receiving device 118 receives from a secure external device in wireless communication with the media content receiving system, a decryption key or part of a decryption key needed to aid in decryption of the received at least one portion of the streaming media content program.

At 708, the receiving device 118 decrypts the at least one portion of the streaming media content program using the received decryption key or the received part of the decryption key received from the wireless device.

FIG. 8 is a flow diagram of method 800 of securely providing streaming media content on-demand from an example perspective of the example secure remote-control devices shown in FIG. 1, FIG. 3 and FIG. 4, according to one example embodiment.

At 802, the secure remote 128 receives user input indicative of a request for a streaming media content program.

At 804, the secure remote 128, in response to the received user input, transmits a request to a receiving device 118 for the streaming media content program and transmits information to a receiving device 118 to enable authentication of the request.

At 806, the secure remote 128 transmits to the receiving device 118 a decryption key or part of a decryption key needed to aid in decryption of the requested streaming media content program. The decryption key may be stored in a secure memory area 416 of the secure remote 128.

While various embodiments have been described herein above, it is to be appreciated that various changes in form and detail may be made without departing from the spirit and scope of the invention(s) presently or hereafter claimed.

The invention claimed is:

1. A method in a media content transmission system, the method comprising:
receiving, by the media content transmission system, a first request for a streaming media content program, the first request originating from a first secure remote control device communicatively coupled to a first remote receiving device;
in response to receiving the first request, authenticating, by the media content transmission system, the first request as being associated with a first authorized identifier of a plurality of authorized identifiers, the first authorized identifier being associated with the first secure remote control device communicatively coupled to the first remote receiving device;
in response to authenticating the first request as being associated with the first authorized identifier, using, by the media content transmission system, a first encryption key uniquely associated with the first authorized identifier and uniquely associated with a specific occurrence of the received request to begin encrypting at least one portion of the requested streaming media content program; and
transmitting, by the media content transmission system, the encrypted at least one portion of the streaming media content program to the first remote receiving device substantially as the encrypted at least one portion of the streaming media content program becomes encrypted.

2. The method of claim 1 further comprising authenticating, by the media content transmission system, the first request as being associated with first of a plurality of authorized users based on each of the plurality of authorized identifiers uniquely identifying the first authorized user.

3. The method of claim 1, further comprising:
receiving, by the media content transmission system, a second request for the streaming media content program, the second request originating from a second secure remote control device communicatively coupled to a second remote receiving device;
in response to receiving the second request, authenticating, by the media content transmission system, the second request as being associated with a second of the plurality of authorized identifiers, the second authorized identifier being associated with the second secure remote control device communicatively coupled to the second remote receiving device;
in response to authenticating the second request as being associated with the second authorized identifier, using, by the media content transmission system, a second encryption key uniquely associated with the second authorized identifier and uniquely associated with the second received request to begin encrypting the at least one portion of the requested streaming media content program; and
transmitting, by the media content transmission system, the encrypted at least one portion of the streaming media content program to the second remote receiving device substantially as the encrypted at least one portion of the streaming media content program becomes encrypted.

4. The method of claim 1 wherein the at least one portion of the streaming media content program comprises the entire streaming media content program.

5. The method of claim 1 wherein the at least one portion of the streaming media content program is a pre-determined percentage of the entire streaming media content program.

6. The method of claim 1 wherein the secure remote control device comprises a mobile telephone.

7. The method of claim 1 wherein the secure remote control device is operable to transmit a decryption key or a part of a decryption key to the first remote receiving device to aid in decryption at the receiving device of the encrypted at least one portion of the streaming media content program.

8. The method of claim 7 wherein the first remote receiving device is a television or a DVD player external to the first remote receiving device.

9. The method of claim 1, further comprising:
generating the first encryption key, by the media content transmission system, based on a pseudo random number provided by the smart remote control.

10. The method of claim 9, further comprising:
receiving the pseudo random number via the first remote receiving device.

11. The method of claim 1, further comprising:
generating, by the media content transmission system, a pseudo random number; and
generating the first encryption key, by the media content transmission system, based on the pseudo random number and the first authorized identifier; and
providing the pseudo random number to the first secure remote control device, wherein the secure control device utilizes the pseudo random number and the first authorized identifier to generate at least a portion of the first decryption key.

12. The method of claim 1 further comprising:
generating, the encryption key, by the media content transmission system, based on a time associated with receipt of the first request from the first remote receiving device.

13. The method of claim 1 further comprising:
generating, the encryption key, by the media content transmission system, based on a number of previous occurrences of received requests for streaming media content programs that are each associated with the one of the plurality of authorized identifiers for the first secure remote control.

14. A computer-implemented method in a media content receiving system, the method comprising:
receiving an authorized identifier for a secure remote control;
transmitting, by the media content receiving system, a request for a streaming media content program to a media content transmission system from the media content receiving system;
transmitting the authorized identifier to the media content transmission system;
in response to the transmitting the authorized identifier, receiving, by the media content receiving system, at least one portion of the streaming media content program encrypted with an encryption key that is uniquely associated with the authorized identifier associated with the transmitted request and that is uniquely associated with a specific occurrence of the transmitted request;
receiving, by the media content receiving system, from a secure remote control device in wireless communication with the media content receiving system, a decryption key or part of a decryption key needed to aid in decryption of the received at least one portion of the streaming media content program; and
decrypting, by the media content receiving system, the at least one portion of the streaming media content program using the received decryption key or the received part of the decryption key received from the wireless remote control device.

15. The method of claim 14 wherein the media content receiving system comprises a television or a DVD player external to the media content receiving system.

16. The method of claim 14, further comprising:
receiving a pseudo random number from the secure remote control; and
transmitting the pseudo random number to the media content transmission system, wherein the encryption key is generated by the media content transmission system based on the pseudo random number.

17. The method of claim 14, further comprising:
receiving a pseudo random number from the media content transmission system; and
transmitting the pseudo random number to the secure remote control, device, wherein the secure remote control device generates the decryption key based on the pseudo random number.

18. The method of claim 14, wherein receiving the decryption key further comprises:
receiving encrypted data, at the media content receiving system, from the secure remote control device; and decrypting the encrypted data, at the media content receiving system, to extract the decryption key for the requested streaming media content.

19. The method of claim 14, further comprising:
outputting a program guide from the media content receiving device; and
receiving user input, at the media content receiving device, from the secure remote control, the user input selecting the streaming media content program from the program guide, wherein the media content receiving device generates the request responsive to the user input.

20. The method of claim 14, wherein the decryption key or part of the decryption key needed to aid in decryption of the received at least one portion of the streaming media content program is a pseudo random number generated by the secure remote control and further comprising:
transmitting the pseudo random number to the media content transmission system, wherein the encryption key is generated by the media content transmission system based on the pseudo random number.

21. The method of claim 14 wherein the encryption key is based on a time associated with receipt of the request transmitted to the media content transmission system for the streaming media content program.

22. A remote control device comprising:
a processor; and
a secure memory area coupled to the processor, wherein the processor is configured to:
receive user input indicative of a request for a streaming media content program;
in response to the received user input, transmit a request to a receiving device for the streaming media content program and transmit information to the receiving device to enable authentication of the request;
transmit to the receiving device, a decryption key or part of a decryption key needed to aid in decryption of the requested streaming media content program that is at least partially encrypted by use of a first encryption key uniquely associated with an authorized identifier stored in the secure memory and uniquely associated with a specific occurrence of the request.

23. The remote control device of claim 22, wherein the processor is further configured to receive an externally generated pseudo random number and generate the decryption key based on the pseudo random number and an authorized identifier stored in the secure memory.

24. The remote control device of claim 22, wherein the processor receives the externally generated pseudo random number from the receiving device.

25. The remote control device of claim 22, wherein the processor receives the externally generated pseudo random number from a remote media content transmission system.

26. The remote control device of claim 22, wherein the processor is configured to transmit the decryption key or part of the decryption key by transmitting the decryption key or the part of the decryption key in response to the user input.

27. The remote control device of claim 22, wherein the processor is configured to transmit the decryption key or part of the decryption key to the receiving device in an encrypted form.

* * * * *